United States Patent Office 3,506,643
Patented Apr. 14, 1970

3,506,643
N⁶-ARALKYL-ADENOSINE DERIVATIVES
Max Thiel, 35 Mannheim S 6, Germany; Kurt Stach, Stegerwaldweg 13, Mannheim-Waldhof, Germany; Werner Jahn, Zu Forstquelle 4, Heidelberg, Germany; and Wolfgang Schaumann, Sandhoferstrasse 124; and Karl Dietmann, Amalie-Sieveking-Weg 11, both of Mannheim-Waldhof, Germany
No Drawing. Filed Oct. 18, 1967, Ser. No. 676,032
Claims priority, application Germany, Dec. 9, 1966, B 90,219; July 11, 1967, B 93,416
Int. Cl. C07d 51/54
U.S. Cl. 260—211.5                    8 Claims

ABSTRACT OF THE DISCLOSURE

A class of novel N⁶-aralkyl-adenosine derivatives is disclosed which constitute valuable therapeutic agents being particularly useful because of their effect on the cardiac and vascular systems.

---

The N⁶-aralkyl adenosine derivatives have the following formula:

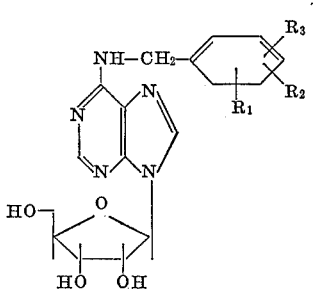

wherein $R_1$, $R_2$ and $R_3$ each represent hydrogen, halogen, alkyl, alkoxy, trifluoromethyl or alkylmercapto, with the proviso that only two of said substituents $R_1$–$R_3$ can simultaneously be hydrogen and further wherein two of said substitutents taken together can represent methylenedioxy.

Compositions containing such novel N⁶-aralkyl-adenosine derivatives and the methods of using the latter in the treatment and regulation of cardiac and/or vascular disturbances is also disclosed.

The invention relates to new N⁶-aralkyl-adenosine derivatives and a process for producing and using the same.

The N⁶-aralkyl-adennsine derivatives according to the present invention correspond to the formula:-

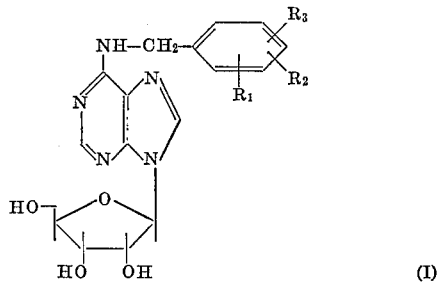

wherein $R_1$, $R_2$ and $R_3$ stand independently from each other for hydrogen, halogen, alkyl, alkoxy, trifluoromethyl or alkylmercapto with the proviso that only two of said substituents can simultaneously represent hydrogen and further wherein two of said substituents together can represent a methylenedioxy group.

The N⁶-aralkyl-adenosine derivatives produced according to the present invention possess useful pharmacological properties and in particular have an action on the blood vessels and circulation.

The procedure for producing the new N⁶-aralkyl-adenosine derivatives according to the present invention involves methods known per se. Thus, for example, purine ribosides of the formula:

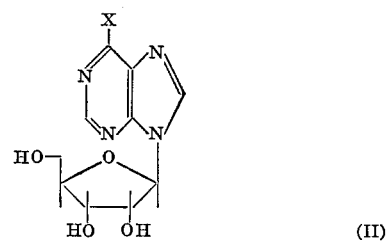

wherein X is halogen or a reactive mercapto group, can be reacted with a benzylamine of the formula:

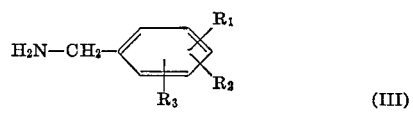

wherein $R_1$, $R_2$ and $R_3$ have the same meanings as given above, possibly with the intermediate protection of the hydroxyl groups in the sugar residue; or an N¹-substituted adenosine derivative of the formula:

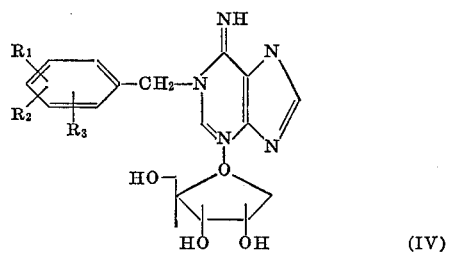

wherein $R_1$, $R_2$ and $R_3$ have the same meanings as given above, or their corresponding derivatives in which the hydroxyl groups in the sugar residue are protected, are heated in alkaline solution, whereafter, if necessary, the protective groups are removed by acidic saponification.

As reactive mercapto groups X in the compounds of Formula II, it is preferred to use either methylmercapto or benzylmercapto groups.

Preferred protective groups for the hydroxyl groups in the sugar residues include acyl groups, as well as the acetals and ketals. The acyl groups are preferably subsequently removed by alkaline saponification, whereas the cyclic acetals and ketals can be split off by the action of acids, preferably with formic acid or dilute mineral acids.

The compounds (IV) used as starting materials can be prepared by the reaction of adenosine or of an adenosine acetal or ketal with conventional N-alkylation agents However, it is preferred to use compounds of the formula:

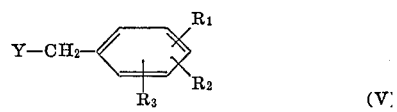

wherein $R_1$, $R_2$ and $R_3$ have the same meanings as set out above and Y is a reactive residue, such as a halogen atom, an aliphatic or aromatic sulfonyl radical or the like According to a preferred variant of this process, the isolation of the compounds (IV) is omitted, the solution obtained being rendered weakly alkaline and then heated for a short time. In this manner, there are obtained di rectly the compounds (I) or the corresponding acetals or ketals which are subsequently converted into the free adenosine derivatives by the action of acids.

In the case of the reaction of the purine riboside derivative (II) with the benzylamine (III), the two reaction components are preferably warmed together in a solvent and the reaction mixture worked up in the usual way.

The following examples are given for the purpose of illustrating the present invention and are in nowise to be construed in limitation thereof.

EXAMPLE 1

$N^6$-(2-chlorobenzyl)-adenosine 8.2 g. triacetyl-6-chloropurine-9-($\beta$-D-riboside) (cf. Zemicka and Sorm, Coll. czech. Comm., 30, 1880/1965) and 7.2 g. 2-chlorobenzylamine were boiled under reflux for 2 hours in 120 ml. isopropanol. The reaction mixture was evaporated in a vacuum, the residue taken up with chloroform, the chloroform solution washed with water and then, following drying, evaporated to dryness. The evaporation residue was dissolved in 100 ml. methanol and mixed with 10 ml. 1 N sodium methylate solution. The resulting reaction mixture was boiled under reflux for one hour, cooled to 0° C. and filtered with suction. There were thusly obtained 4 g. (51% of theory) $N^6$-(2-chlorobenzyl)-adenosine having a melting point of 182–183° C.

EXAMPLE 2

$N^6$-(3,4-dichlorobenzyl)-adenosine

In a manner analogous to that described in Example 1, but using 10.6 g. 3,4-dichlorobenzylamine, there were obtained 3.2 g. (38% of theory) $N^6$-(3,4 dichlorobenzyl)-adenosine having a melting point of 182–183° C.

EXAMPLE 3

$N^6$-(4-methoxy-benzyl)-adenosine

A procedure analogous to that described in Example 1 was followed with the exception that 7 g. 4-methoxy-benzylamine were used in place of 2-chlorobenzylamine. There were obtained 2.6 g. (33% of theory) $N^6$-(4-methoxy-benzyl)-adenosine having a melting point of 146–147° C.

EXAMPLE 4

$N^6$-(3,4-dimethoxy-benzyl)-adenosine

The procedure analogous to that described in Example 1 was followed but with the use of 8.4 g. 3,4-dimethoxybenzylamine. There were thusly obtained 4.2 g. (51% of theory) $N^6$-(3,4-dimethoxy-benzyl)-adenosine having a melting point of 135–136° C.

EXAMPLE 5

$N^6$-(3,4,5-trimethoxy-benzyl)-adenosine

In a manner analogous to that described in Example 1, there were obtained from 13.7 g. triacetyl-6-chloropurine-9-($\beta$-D-riboside) and 16.5 g. 3,4,5-trimethoxybenzylamine, 9.3 g. (65% of theory)-$N^6$-(3,4,5-trimethoxy-benzyl)-adenosine having a melting point of 118–119° C.

EXAMPLE 6

$N^6$-(4-bromobenzyl)-adenosine 10 g. 2′, 3′-O-isopropylidene-adenosine were suspended in 200 ml. acetonitrile and, after the addition of 10 g. p-bromobenzyl bromide, the mixture was boiled for 24 hours under reflux, while stirring. The precipitate formed was filtered off with suction, dissolved in about 150 ml. methanol and, after the addition of the same volume of 2 N sodium hydroxide solution, heated on a steam bath for 20 minutes. The reaction mixture was extracted with chloroform the chloroform extract then evaporated and the residue dissolved in about 200 ml. formic acid. Water was then added thereto until the commencement of cloudiness and the mixture left to stand for one day at ambient temperature. The mixture was thereafter evaporated in a vacuum and the residue rendered weakly alkaline with a concentrated aqueous solution of ammonia. The product which was thereby formed was filtered off with suction and recrystallized from methanol. There were obtained 5.8 g. (41% of theory) $N^6$-(4-bromobenzyl)-adenosine having a melting point of 168–169° C.

EXAMPLE 7

$N^6$-(2,6-dichlorobenzyl)-adenosine

*Variant I.*—Using a procedure analogous to that described in Example 6, from 10 g. isopropylidene-adenosine and 10 g. 2,6-dichlorobenzyl bromide, there were obtained 6 g. (43% of theory) $N^6$-2,6-dichlorobenzyl)-adenosine having a melting point of 208–209° C.

*Variant II.*—5.7 g. 6-chloropurine-9-($\beta$-D-riboside) (cf. Zemlicka and Sorm, loc. cit.) and 6.8 g. 2,6-dichlorobenzylamine were boiled under reflux for 6 hours in 100 ml. isopropanol. The reaction mixture was then evaporated to dryness and the residue recystallized from methanol/water. There were obtained 3.4 g. (40% of theory) $N^6$-(2,6-dichlorobenzyl)-adenosine having a melting point of 207–209° C.

EXAMPLE 8

$N^6$-(4-chlorobenzyl)adenosine

*Variant I.*—In a manner analogous to that described in Example 6, there were obtained from 10 g. isopropylidene-adenosine and 10 g. p-chlorobenzyl bromide, 2 g. (15% of theory) $N^6$-(4-chlorobenzyl)-adenosine having a melting point of 174–175° C.

*Variant II.*—In a manner analogous to that described in Example 1, but with the use of 7.2 g. 4-chlorobenzylamine, there were recovered 4.2 g. (54% of theory) $N^6$-(4-chlorobenzyl-adenosine having a melting point of 174–175° C.

EXAMPLE 9

$N^6$-(3-chlorobenzyl)-adenosine

In a manner analogous to that described in Example 1, from 8.2 g. triacetyl-6-chloropurine-9-($\beta$-D-riboside) and 8.5 g. 3-chlorobenzylamine, there were obtained 3.3 g. (43% of theory) $N^6$-(3-chlorobenzyl)-adenosine having a melting point of 168–169° C.

EXAMPLE 10

$N^6$-(2-methoxy-benzyl)-adenosine

A mixture of 8.2 g. triacetyl-6-chloropurine-9-($\beta$-D-riboside), 3.5 g. 2-methoxy-benzylamine, 3.9 g. diisopropylethylamine and 100 ml. isopropanol was boiled under reflux for one hour. The reaction mixture was then evaporated in a vacuum, the residue taken up in chloroform, the chloroform solution washed with water and again evaporated. The resulting residue was taken up in methanol and mixed with 8 ml. 1 N sodium methylate solution. After standing for several hours, the reaction mixture was filtered with suction and the product obtained washed with methanol and ether. There were obtained 6.3 g. (81% of theory) $N^6$-(2-methoxy-benzyl)-adenosine having a melting point of 147–148° C.

EXAMPLE 11

$N^6$-(2-methyl-benzyl)-adenosine

In a manner analogous to that described in Example 10, from 8.3 g. triacetyl-6-chloropurine-($\beta$-D-riboside) and 2.6 g. 2-methyl-benzylamine, there were obtained 3.8 g. (51% of theory) $N^6$-(2-methyl-benzyl)-adenosine having a melting point of 157°–158° C.

EXAMPLE 12

$N^6$-(3,5-dimethoxy-benzyl)-adenosine

Following a procedure analogous to that described in Example 10, there were obtained from 8.3 g. triacetyl-6- chloropurine-9-(β-D-riboside) and 3.7 g. 3,5-dimethoxy-benzylamine, 4.9 g. (59% of theory) N⁶-(3,5-dimethoxybenzyl)-adenosine having a melting point of 191–192° C.

EXAMPLE 13

N⁶-(2-methylmercapto-benzyl)-adenosine

In a manner analogous to that described in Example 1, from 8.2 g. triacetyl-6-chloropurine-9-(β-D-riboside) and 7.4 g. 2-methylmercapto-benzylamine, there were obtained 3.2 g. (53% of theory) N⁶-(2-methylmercaptobenzyl)-adenosine having a melting point of 127–128° C.

EXAMPLE 14

N⁶-(2-trifluoromethyl-benzyl)-adenosine 8.3 g. triacetyl-6-chloropurine-9-(β-O-riboside) (cf. Zemlicka and Sorm, Coll. czech. Comm., 30, 1880/1965), 3.9 g. 2-trifluoromethyl-benzylamine and 3.9 g. diisopropyl-ethylamine were boiled for 2 hours in 150 ml. isopropanol. The reaction mixture was then evaporated in a vacuum, the residue taken up in chloroform, the chloroform solution washed with water and, after drying, evaporated to dryness. The evaporation residue was dissolved in 100 ml. methanol and mixed with 10 ml. 1 N sodium methylate solution. The resulting reaction mixture was boiled under reflux for one hour, cooled to 0° C. and the product obtained filtered off with suction. There were thusly obtained 6.5 g. (76% of theory) N⁶-(2-trifluoromethyl-benzyl)-adenosine having a melting point of 160–161° C.

EXAMPLE 15

N⁶-(3-trifluoromethyl-benzyl)-adenosine

In a manner analogous to that described in Example 14, but with the use of 3.9 g. 3-trifluoromethyl-benzylamine, there were obtained 4.5 g. (53% of theory) N⁶-(3-trifluoromethyl-benzyl)-adenosine having a melting point of 111–112° C.

Adenosine on intravenous administration to mammals and humans produces a vasodilation. In particular, this effect is noticeable in the coronary vascular system wherein a marked increase in blood circulation results from the vasodilation produced by the administration of the adenosine (Berne, Blackmon and Gardner, J. clin. Invest. 36, 1101 (1957)). Due to the rapid deamination of the adenosine, however, this effect is extremely transient. N(6)-substituted derivatives of adenosine also exert a marked coronary vasodilating effect of high specificity, but in contrast to adenosine, the effect is a prolonged one.

In order to compare the effectiveness of the novel N(6)-substituted adenosine derivatives, on the coronary blood circulation, N(6)-methyl adenosine which has already been described in the literature (Bredereck, Haas u. Martini, Chem. Ber. 81, 307 (1948) and/or Baer, Drummond u. Duncan, Mol. Pharmacol. 2, 67 (1966)) has been selected as comparison agent.

An increased blood circulation in the coronary system, provided that there are no significant changes in the myocardial oxygen consumption, results in a reciprocal decrease of the coronary arteriovenous oxygen difference. This decrease in extraction of oxygen from the blood leads to an additional supply of oxygen, i.e., to an improvement in the oxygen supply to the myocardium which is the ultimate aim sought to be achieved with all coronary dilating agents.

For the purpose of obtaining an exact basis for evaluating the results of the tests, the decrease in coronary arteriovenous oxygen difference (at the time of the maximum effect) is reported in volume percent as compared to the starting value. The greater the value reported the more significant was the coronary oxygen supply increase.

The tests were carried out using 32 alert unanesthetized dogs, each weighing between 12 and 16 kg. and following the procedure of Rayford, Huvos and Gregg, Proc. Soc. exp. Biol. Med. 113, 876 (1963)). Catheters were implanted surgically into the Sinus coronarius, the aorta and the vena cava of the animals whereby it was made possible to photometrically determine the coronary arteriovenous saturation difference (Brinkman, Arch. Chir. Neerl. 1, 177 (1949)) and from the actual hemoglobin values obtained to convert the values into the corresponding volume percents. The compounds were administered intravenously in the amounts indicated in 1 ml. of a 5% Lutrol-9-solution (liquid polyethylene oxide, molecular weight about 400, BASF-Ludwigshafen) in 5.5 percent aqueous glucose.

The following compounds were employed in the test procedures:

A—N⁶-methyl adenosine—comparison
B—N⁶-(4-chlorobenzyl)-adenosine
C—N⁶-(2-chlorobenzyl)-adenosine
D—N⁶-(3-chlorobenzyl)-adenosine
E—N⁶-(3,4-dichlorobenzyl)-adenosine
F—N⁶-(4-methoxybenzyl)-adenosine
G—N⁶-(3,4-dimethoxybenzyl)-adenosine
H—N⁶-(3,4,5-trimethoxybenzyl)-adenosine
I—N⁶-(4-bromobenzyl)-adenosine
J—N⁶-(2-methylbenzyl)-adenosine
K—N⁶-(3,5-dimethoxybenzyl)-adenosine
L—N⁶-(2-methoxybenzyl)-adenosine
M—N⁶-(2-methylmercaptobenzyl)-adenosine
N—N⁶-(2-trifluoromethylbenzyl)-adenosine
O—N⁶-(3-trifluoromethylbenzyl)-adenosine The results of the test procedures are set out in the following table. From the table, it can be seen that the novel compounds exhibit marked coronary dilating properties in contrast to the known comparison compound which is substantially ineffective in a dosage range of 0.4–2.0 mg./kg.

| Compound: | Doses, mg./kg. I.V. | Decrease of the Coronary O₂-depletion (at maximum effect) in vol. percent as compared to the starting values |
|---|---|---|
| A | 0.4 | ¹ ±0.0 |
|   | 2.0 | ¹ ±0.0 |
| B | 0.2 | 3.3 |
| C | 0.4 | 6.8 |
| D | 0.4 | 5.7 |
| E | 0.4 | 5.2 |
| F | 0.4 | 4.0 |
| G | 0.2 | 7.2 |
| H | 0.4 | 4.9 |
| I | 0.4 | 0.8 |
| J | 0.4 | 6.4 |
| K | 0.4 | 8.2 |
| L | 0.4 | 2.9 |
| M | 0.4 | 6.5 |
| N | 0.4 | 6.8 |
| O | 0.4 | 2.6 |

¹ Without effect.

As previously indicated, the adenosine derivatives of this invention are readily adapted to therapeutic use as cardio and circulatory agents. The toxicity of the compounds of the invention has been found to be quite low or substantially non-existent when they are administered in amounts that are sufficient to achieve the desired therapeutic effects. Moreover, no other pharmacological side effects have been observed to occur as a result of their administration.

In accordance with the method of treatment of the present invention, the compounds can be given via the oral route. However, the compounds can also be administered as parenterals in the form of their solutions or suspensions. The compounds can be administered either alone and/or preferably in combination with a pharmaceutically acceptable carrier, and such administration can be carried out in both single and multiple dosages. More particularly, the compounds of this invention can be administered in a wide variety of different dosage forms wherein they are combined with various pharmaceutically acceptable inert carriers in the form of tablets, capsules, dragees, powders, aqueous suspensions, solutions, and the like. Such carriers include solid diluents or filters, liquid aqueous media and various non-toxic organic solvents, etc. In general, the therapeutically effective compounds are present in such dosage forms at concentration levels ranging from about 0.01 to about 90% by weight of the total composition, i.e., in amounts which are sufficient to provide the desired unit dosage.

In dosage unit form, the compounds as set out herein are used in amounts of from 0.1–50 mg. active ingredient per dosage unit. Preferably, the compositions are compounded so that for parenteral administration, 0.5–5 mg. active compound/dosage unit is present and for oral administration 2–10 mg. of compound/dosage unit.

What we claim is:

1. An $N^6$-substituted adenosine derivative having the formula:

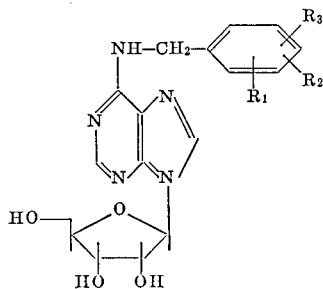

wherein $R_1$, $R_2$ and $R_3$ each represent a member selected from the group consisting of hydrogen, chloro, bromo, lower alkyl, lower alkoxy, trifluoromethyl and lower alkylmercapto and wherein any two of said substituents $R_1$–$R_3$ taken together can represent methylenedioxy, with the proviso that only two of said substituents $R_1$–$R_3$ can simultaneously be hydrogen.

2. An $N^6$-substituted adenosine derivative according to claim 1 designated $N^6$-(2-chlorobenzyl)-adenosine.

3. An $N^6$-substituted adenosine derivative according to claim 1 designated $N^6$-(4-chlorobenzyl)-adenosine.

4. An $N^6$-substituted adenosine derivative according to claim 1 designated $N^6$-(3,4-dimethoxybenzyl)-adenosine.

5. An $N^6$-substituted adenosine derivative according to claim 1 designated $N^6$-(2-methylbenzyl)-adenosine.

6. An $N^6$-substituted adenosine derivative according to claim 1 designated $N^6$-(2-trifluoromethylbenzyl)-adenosine.

7. An $N^6$-substituted adenosine derivative according to claim 1 designated $N^6$-(3,5-dimethoxybenzyl)-adenosine.

8. An $N^6$-substituted adenosine derivative according to claim 1 designated $N^6$-(2-methylmercaptobenzyl)-adenosine.

References Cited
UNITED STATES PATENTS 3,014,900  12/1961  Schroeder _____ 260—211.5

LEWIS GOTTS, Primary Examiner

J. R. BROWN, Assistant Examiner

U.S. Cl. X.R.

424—180

UNITED STATES PATENT OFFICE
CERTIFICATE OF CORRECTION

Patent No. 3,506,643         Dated April 14, 1970

Inventor(s) Max Thiel, Kurt Stach, Werner John, and Wolfgang Schaumann

It is certified that error appears in the above-identified patent and that said Letters Patent are hereby corrected as shown below:

Column 2, formula (IV)

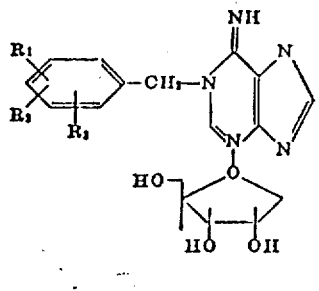   should be   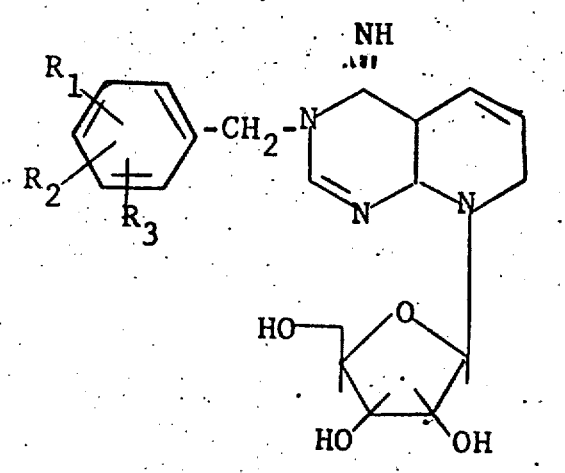

Column 3, line 16, "Zemicka" should be -- Zemlicka --.

SIGNED AND SEALED
AUG 25 1970

(SEAL)
Attest:

Edward M. Fletcher, Jr.
Attesting Officer

WILLIAM E. SCHUYLER, JR.
Commissioner of Patents